United States Patent
Boullosa Vazquez et al.

(10) Patent No.: US 7,628,420 B2
(45) Date of Patent: Dec. 8, 2009

(54) VEHICLE STEERING WHEEL WITH AN INTEGRATED AIR BAG

(75) Inventors: Javier Boullosa Vazquez, Pontevedra (ES); Jorge Ollero Ollero, Pontevedra (ES)

(73) Assignee: Dalphi Metal Espana, S.A., Madrid (ES)

( * ) Notice: Subject to any disclaimer, the term of this patent is extended or adjusted under 35 U.S.C. 154(b) by 128 days.

(21) Appl. No.: 11/708,713

(22) Filed: Feb. 20, 2007

(65) Prior Publication Data

US 2007/0210563 A1 Sep. 13, 2007

(30) Foreign Application Priority Data

Mar. 13, 2006 (ES) .................. 200600639

(51) Int. Cl.
*B60R 21/20* (2006.01)
*B60R 21/203* (2006.01)

(52) U.S. Cl. .................. 280/728.2; 280/731
(58) Field of Classification Search .......... 280/728.2, 280/731
See application file for complete search history.

(56) References Cited

U.S. PATENT DOCUMENTS

| | | | |
|---|---|---|---|
| 5,738,369 A * | 4/1998 | Durrani | 280/731 |
| 6,572,138 B1 * | 6/2003 | Bohn et al. | 280/731 |
| 7,159,898 B2 * | 1/2007 | Thomas | 280/731 |
| 7,380,817 B2 * | 6/2008 | Poli et al. | 280/731 |
| 2005/0230943 A1 * | 10/2005 | Thomas | 280/731 |
| 2005/0248135 A1 * | 11/2005 | Poli et al. | 280/731 |
| 2006/0055154 A1 * | 3/2006 | Salmon et al. | 280/728.2 |
| 2006/0208469 A1 * | 9/2006 | Marotzke et al. | 280/731 |
| 2006/0208470 A1 * | 9/2006 | Tsujimoto et al. | 280/731 |
| 2007/0152428 A1 * | 7/2007 | Poli et al. | 280/728.2 |
| 2007/0210564 A1 * | 9/2007 | Vazquez et al. | 280/731 |

* cited by examiner

*Primary Examiner*—Paul N. Dickson
*Assistant Examiner*—Barry Gooden, Jr.
(74) *Attorney, Agent, or Firm*—Ladas & Parry LLP

(57) ABSTRACT

The invention relates to a steering wheel (11) of an automotive vehicle with an integrated airbag module (21), with cooperating means for fixing the airbag module (21) in the steering wheel those incorporated in the steering wheel (11) consisting of two arms (33) with a hook (39) at their end incorporated in the framework (17) in the area of one of its radii (15) and those incorporated in the airbag (21) consisting of a spring (31) arranged in the lower part which is snap-fitted to said hooks (39) by vertical pushing in two snap-fitting parts (32), said arms (33) including an open channel (41) in the lower part thereof to allow the passage of a tool (45) which can remove the snap-fitting of the airbag module (21) by pushing said snap-fitting parts (32) of the spring (31).

3 Claims, 2 Drawing Sheets

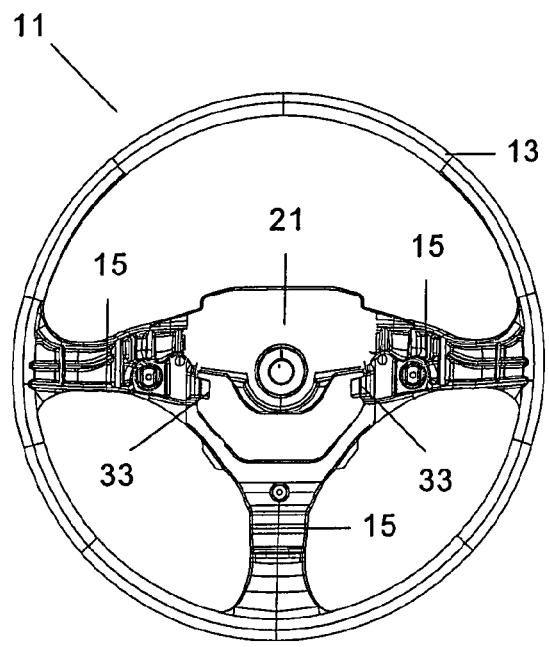
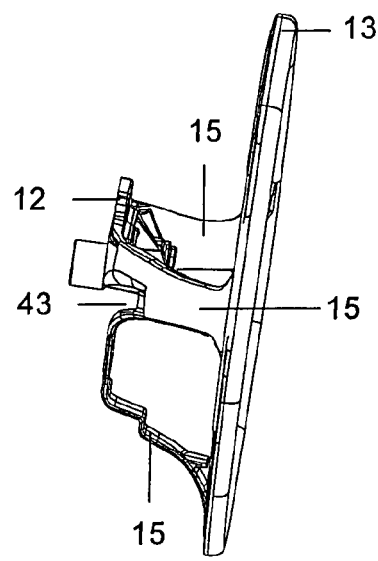
FIG. 1  FIG. 2
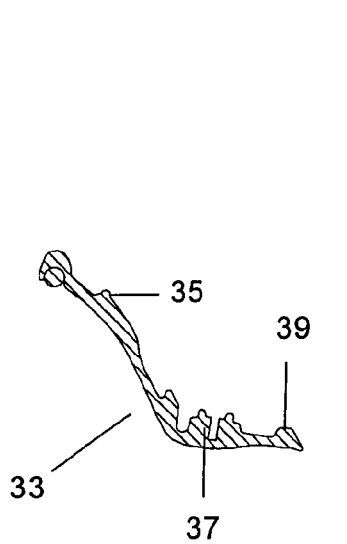
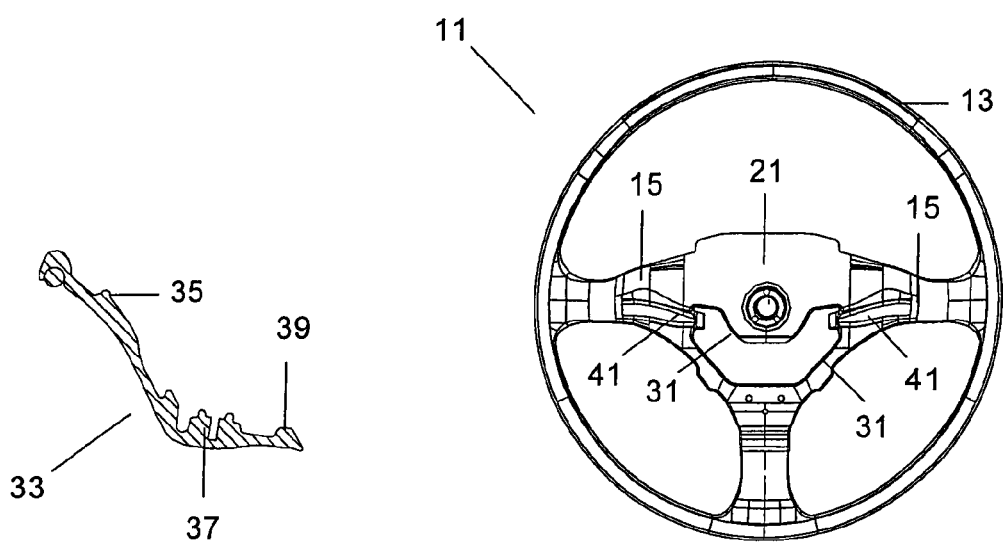
FIG. 4  FIG. 3

VEHICLE STEERING WHEEL WITH AN INTEGRATED AIR BAG

FIELD OF THE INVENTION

The present invention relates to a steering wheel of an automotive vehicle with an integrated airbag module and, more particularly to a steering wheel of an automotive vehicle with an airbag module snap-fitted to the steering wheel.

BACKGROUND OF THE INVENTION

Spanish utility model 1 040 263, of the same applicant of the present invention, describes means of snap-fitting the airbag module to the steering wheel consisting of, on one hand, a spring having one or two fixing points in the casing of the airbag module and on the other hand, a steering wheel insert which is made up of a body ending in an arrow tip to allow its easy introduction in a receptacle locking said spring and keeping it retained by the horizontal section of the mentioned insert. Furthermore, the steering wheel includes an access from the outside through which, using a screwdriver or the like, it is possible to overcome the resistance of the spring and allow the release of the snap-fitting, and therefore the extraction of the insert from the receptacle where it is retained by the spring.

European patent EP 1 179 457 describes means of snap-fitting the airbag module to the steering wheel consisting of on one hand, feet integral with the steering wheel, and on the other hand, an elastic rod arranged in the casing of the airbag module. For removably snap-fitting the airbag module said elastic rod is deformed by means of a suitable tool.

A drawback of the previous technique is that the snap-fitting removal operation is not easy, since the immediate contact of the snap-fitting removal tool with the snap-fitting spring is not ensured, which means that several attempts may be necessary until this is obtained.

The present invention is aimed at solving this drawback.

SUMMARY OF THE INVENTION

The steering wheel of an automotive vehicle with an integrated airbag, according to the present invention, comprises:

A steering wheel with a base, a ring and several radii structured by a framework and a foam filling.

An airbag module.

Cooperating means for fixing the airbag module in the steering wheel, consisting of:

a) In the steering wheel, at least two arms with a hook at their ends incorporated in the framework of the steering wheel in the area of one of its radii.

b) In the airbag module, a spring arranged in the lower part thereof with two areas provided for being snap-fitted to said hooks by vertical pushing.

an open channel in the lower part of said arms to allow the passage of a tool which can remove the snap-fitting of the airbag module by pushing said springs.

An important feature of the present invention is that not only is said channel useful as a passage conduit for the snap-fitting removal tool but also as a guide for such tool, considerably facilitating the snap-fitting removal operation.

Other features and advantages of the present invention will be understood from the following detailed description of an illustrative and by no means limiting embodiment of its object in relation to the attached drawings.

DESCRIPTION OF THE DRAWINGS

FIG. 1 is a front view of an automotive steering wheel according to the present invention.

FIG. 2 is a side view of an automotive steering wheel according to the present invention.

FIG. 3 is a rear view of an automotive steering wheel according to the present invention.

FIG. 4 is a section view of an arm incorporated to the automotive steering wheel according to the present invention to be used as fixing means of the airbag module.

DETAILED DESCRIPTION OF THE INVENTION

Figure 5A:
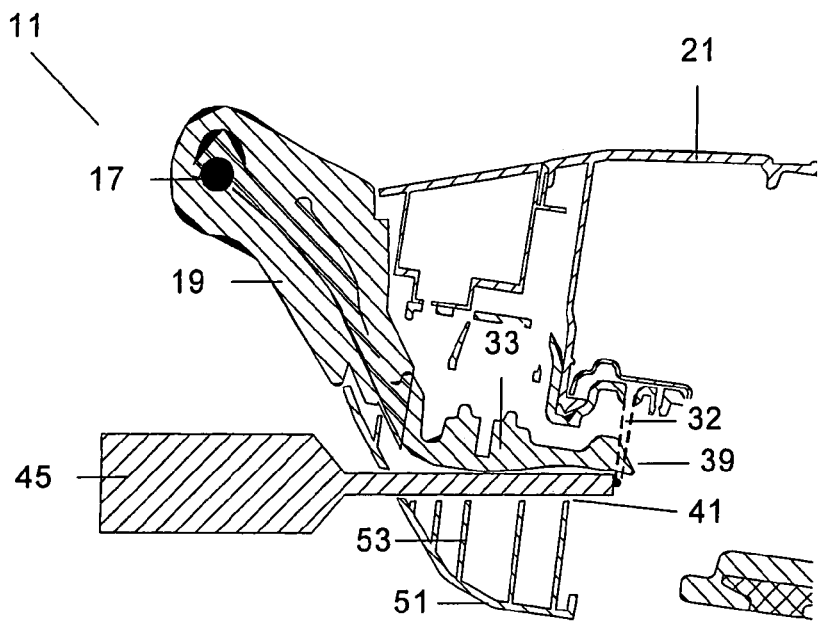
FIGS. 5a and 5b are cross-section views of an automotive steering wheel with an integrated airbag module according to the present invention, illustrating the snap-fitting removal operation of the module.
Figure 5B:
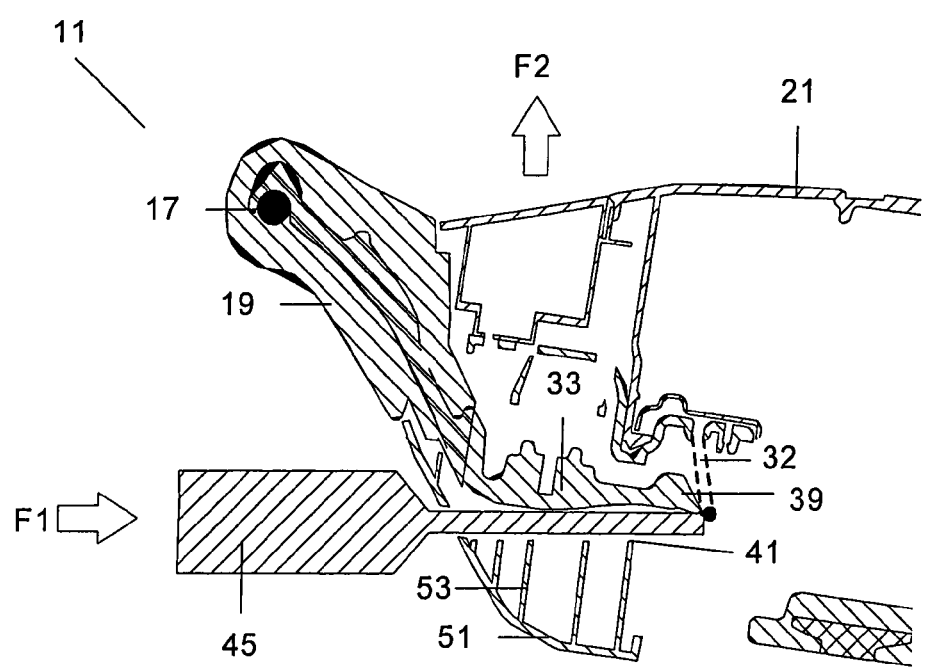

The figures show a steering wheel of an automotive vehicle 11 which is configured, as is well known in the state of the art, with a base 12, a ring 13 and several radii 15 and is structured on the basis of a framework 17 and a foam filling 19. The steering wheel 11 incorporates an airbag module 21 fixed thereto.

Fixing the airbag module 21 to the steering wheel 11 is done by means of snap-fitting two snap-fitting parts 32 of a spring 31 located in the lower part of the airbag module 21 into the two hooks 39 of the arms 33 incorporated in the framework 17 of the steering wheel 11. This snap-fitting is done vertically since the spring 31 is elastic. In a preferred embodiment, said snap-fitting parts 32 of the spring 31 are U-shaped.

Said arms 33 are incorporated to the framework 17 of the steering wheel 11 in the areas occupied by two diametrically opposed radii 15 and a first part 35, integrated in the structure of the steering wheel, and a second part 37 projecting from said structure can be distinguished.

The arms 33 in turn include an open channel 41 in the lower part thereof serving as a passage conduit of a tool 45 for removing the snap-fitting of the airbag module 21 pushing the snap-fitting parts 32 of said spring 31. This channel 41 has its inlet in the lower part of the radius 15 of the steering wheel 11. The rear cover 51 of the steering wheel in turn includes ribs 53 ending in line with the channel 41 to facilitate the guiding of the tool 45 during the snap-fitting removal operation.

In this operation, the force F1 necessary to separate the spring 31 from the hook 39 is applied to the tool 45 in the direction of the channel 41, and the vertical force F2 necessary to release the airbag module 21 is applied at the same time.

Even though several embodiments of the invention have been described and represented, it is clear that it is possible to introduce modifications therein that are comprised within the scope thereof, not considering it to be limited to said embodiments but to the content of the following claims.

The invention claimed is:

1. A steering wheel (11) of an automotive vehicle with an integrated airbag module (21), the steering wheel comprising a base (12), a ring (13), a plurality of radii (15) structured on the basis of a framework (17), a foam filling (19), and a rear cover (51) covering the steering wheel (11) and having a plurality of ribs (53) extending towards the steering wheel (11), the airbag module (21) and the steering wheel (11) comprising cooperating means for fixing the airbag module (21) in the steering wheel (11), wherein:

a) in the steering wheel (11) said cooperating means comprise at least two arms (33), each arm having a hook (39) at its end and being incorporated in the framework (17) of the steering wheel (11) in the area of one of its radii (15);

b) in the airbag module (21), said cooperating means comprise a spring (31) arranged in the lower part which is snap-fit to the hooks (39) by vertical pushing in of two snap-fitting parts (32) configured for such purpose; and c) the arms (33) and the plurality of ribs (53) define an open channel (41) in the lower part of the framework (17) of the steering wheel (11) to guide the passage of a tool (45) which can remove the snap-fitting of the airbag module (21) by pushing the snap-fitting parts (32) of the spring (31).

2. A steering wheel (11) of an automotive vehicle with an integrated airbag module (21) according to claim 1, wherein a first part (35) of each arm (33) is integrated in a radius (15) of the steering wheel (11) and a second part (37) projects from the structure.

3. A steering wheel (11) of an automotive vehicle with an integrated airbag module (21) according to claim 1, wherein an inlet (43) of each channel (41) is located in the lower part of a radius (15) of the steering wheel (11).

* * * * *